United States Patent [19]

Porter, Jr. et al.

[11] 4,149,207
[45] Apr. 10, 1979

[54] CARTRIDGE AND FLEXIBLE MAGNETIC DISK ASSEMBLY

[75] Inventors: Townsend H. Porter, Jr.; Robert E. Schopp, Rochester, both of Minn.

[73] Assignee: International Business Machines Corporation, Armonk, N.Y.

[21] Appl. No.: 845,003

[22] Filed: Oct. 25, 1977

[51] Int. Cl.² .................. G11B 5/016; G11B 5/82; G11B 3/62
[52] U.S. Cl. ........................... 360/133; 360/99
[58] Field of Search ............ 360/133, 135, 86, 97–99; 346/137; 274/42 R

[56] References Cited

U.S. PATENT DOCUMENTS

| | | | |
|---|---|---|---|
| 3,130,393 | 4/1964 | Gutterman | 360/98 |
| 3,156,918 | 11/1964 | Cronquist et al. | 360/98 |
| 3,460,118 | 8/1969 | Woolfolk | 360/135 |
| 3,529,301 | 9/1970 | Hiruta | 360/133 |
| 4,091,454 | 5/1978 | Kauffmann | 360/97 |

OTHER PUBLICATIONS

IBM Tech. Disc. Bull., Nordeng, Flexible Disk Pack Assembly, vol. 18, No. L2, May, 1976, pp. 4128–4129.

*Primary Examiner*—Alfred H. Eddleman
*Attorney, Agent, or Firm*—Keith T. Bleuer

[57] ABSTRACT

A thin flexible magnetic disk rotatably disposed in a cartridge of rigid material and protected thereby. The disk is loosely mounted on a driving hub assembly and has an arrow shaped center hole surrounding a central round hub portion of the hub assembly. A drive pin is carried by the hub assembly and extends loosely through a corresponding hole located in the disk and spaced from the center of the hub assembly and located on a radial line preferably of about 90 degrees with respect to a radial line passing through the apex of the straight hole edges forming the arrow so that the disk is automatically centered on the hub assembly due to any restraint on the disk during its rotation.

20 Claims, 23 Drawing Figures

CARTRIDGE AND FLEXIBLE MAGNETIC DISK ASSEMBLY

BACKGROUND OF THE INVENTION

The invention related to magnetic disks and more particularly to such disks which are thin and flexible and are disposed in protective cartridges therefor.

A thin flexible disk rotatably disposed in a protective envelope or cartridge has previously been proposed in U.S. Pat. No. 3,668,658 issued June 6, 1972. The envelope is of vinyl sheet material of considerably greater thickness than the disk, but it is still somewhat flexible; and the envelope closely encloses the disk which is rotatable therein. A porous wipe is disposed between the disk and the inner surfaces of the cartridge so that, as the disk rotates in contact with the wipe, the wipe maintains the surfaces of the disk clean as well as acting as an anti-static agent.

Such an envelope-disk assembly may be used in a disk drive for example of the type disclosed in U.S. Pat. No. 3,846,836, issued Nov. 5, 1974. The disk has a central opening through it and is clamped to be drivingly rotated by means of a tapered collet which moves through the opening of the disk and into a hollow hub so that the disk is clamped between the tapered collet and the hub. Such a tapered collet is not capable of very accurately centering the disk; however, it is sufficiently accurate so that the disk may have 48 magnetic tracks per inch (1.88 tracks per millimeter). The disk is relatively large, being 7⅞ inches (200 millimeters) in diameter.

SUMMARY OF THE INVENTION

It is an object of the present invention to provide an improved magnetic disk-hub assembly which is so constructed that the disk is capable of a self-centering action with respect to the hub. Still more particularly it is an object of the invention to provide an improved magnetic disk which has a central non-round hole through it for loosely receiving a round drive hub portion and which has an additional hole at one side of the central hole for receiving a drive pin, with the non-round hole being of such configuration that the drive from the pin causes the disk to center itself on the hub portion. It is also an object to provide a variation of the self-centering disk arrangement wherein the hub portion is non-round while the central hole through the disk for receiving the hub portion is round.

It is another object of the invention to provide an improved flexible disk and cartridge assembly in which the disk is loosely disposed in the cartridge, with a swing door disposed on an edge of the cartridge for closing an access opening of the cartridge through which one or more magnetic heads may be moved. It is still a further object of the invention to provide an improved hub assembly for mounting and driving the flexible disk in the cartridge, with the flexible disk having the non-round hole through which the hub assembly extends and with the hub assembly having a drive pin extending loosely through another hole of the flexible disk as above mentioned for centering the disk with respect to the hub assembly.

In a preferred form, the invention includes a flexible magnetic disk having a central arrow shaped hole and a drive hole in the disk located on a radial line extending at about 90 degrees with respect to the radial line extending through the apex of the arrow, a rigid cartridge loosely enclosing the flexible disk and a hub assembly on which the flexible disk is loosely mounted. The hub assembly includes a round hub portion extending through the arrow shaped hole and includes a drive pin loosely extending through the drive hole in the disk so that, as the drive pin is effective for driving the disk, the straight tapering edges of the central hole function to center the disk with respect to the hub assembly.

DESCRIPTION OF THE PREFERRED EMBODIMENTS

Figure 1:
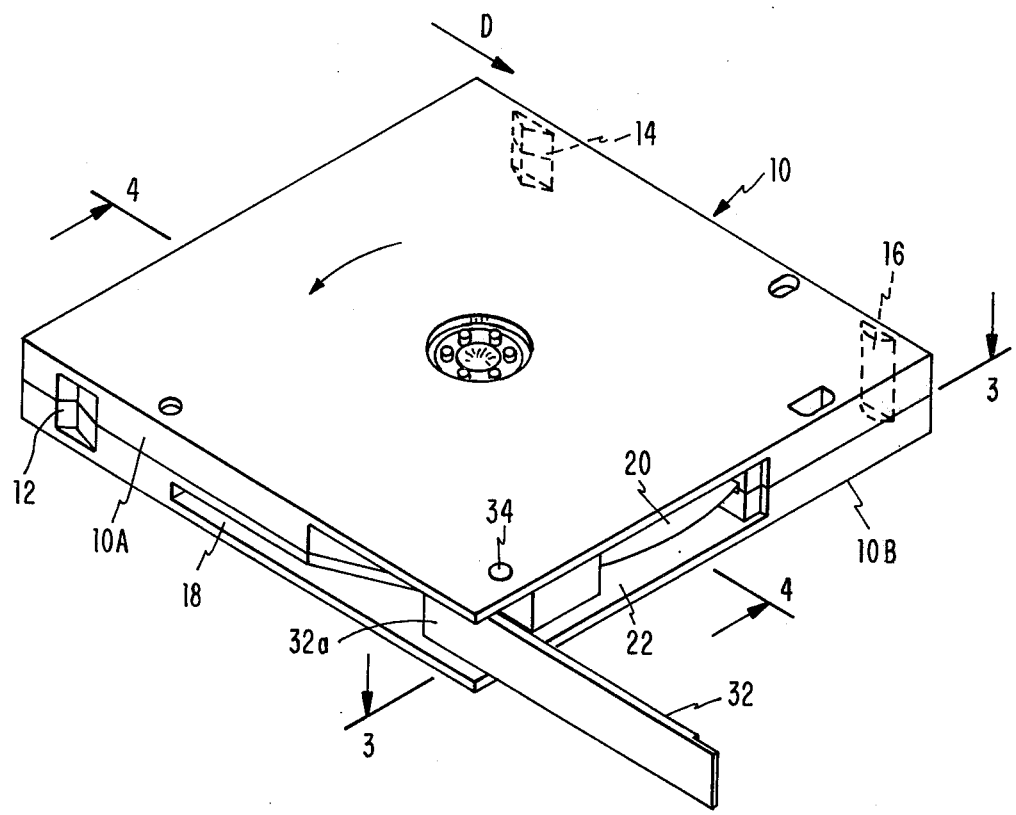
FIG. 1 is an isometric view of magnetic disk cartridge comprising upper and lower halves and swingable dust door making the disk within the cartridge available for upper and lower magnetic heads.

Referring to FIG. 1 in particular, the magnetic disk cartridge 10 therein illustrated may be seen to comprise an upper cover half 10A and a lower cover half 10B, and these halves are fixed together by any suitable means, such as, for example, by a suitable adhesive or by screws. A pair of flat sided notches 12 and 14 are provided in opposite edges of the cartridge 10 by means of which the cartridge may be grasped by any suitable forceps or the like for moving the cartridge 10 laterally. A rounded notch 16 is provided in the same edge of the cartridge 10 as the notch 14, and notch 16 is rounded in cross-section and is adapted to receive a suitable detent ball or roller for yieldably holding the cartridge 10 in a fixed position in the disk drive for which the cartridge 10 is intended. An elongate slot 18 is provided in the cartridge 10 opposite the notch 16, and this is adapted to receive a locating rib in the disk drive for properly locating the cartridge 10 in the drive. The cartridge 10 has only one slot 18, which is only on one edge of the cartridge, preventing it from being loaded upside down in the disk drive.

Figure 4:
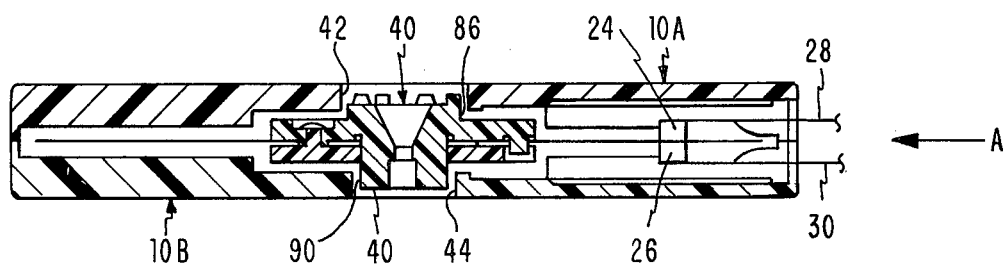
FIG. 4 is a sectional view taken on line 4—4 of FIG. 1 and showing the upper and lower magnetic heads in position on the upper and lower surfaces of the disk.
Figure 13:
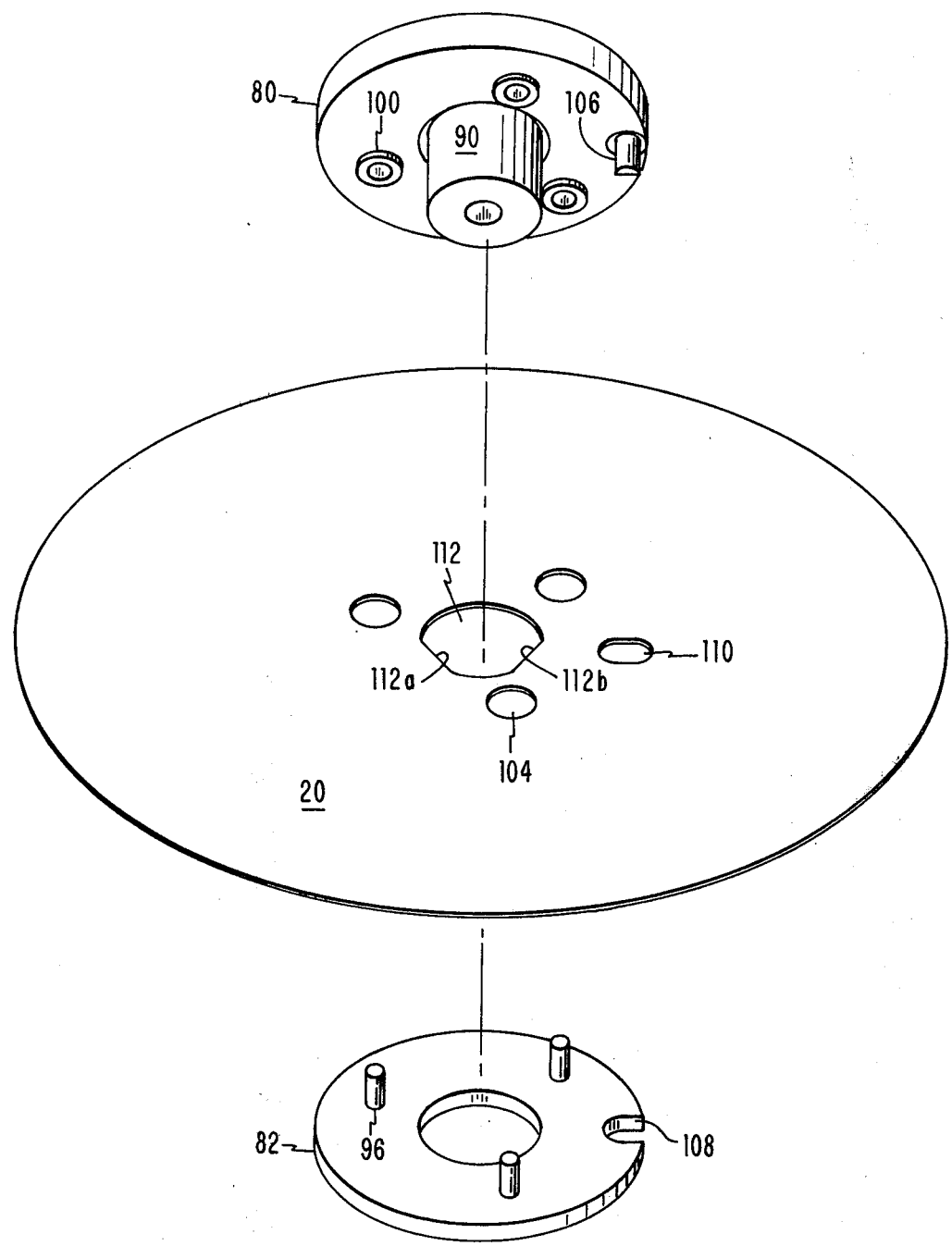
FIG. 13 is an exploded view of the disk and hub assembly and showing a top view of the disk, a bottom view of the hub part of the hub assembly at the top of the figure and a top view of the collar part of the hub assembly at the bottom of the figure.

A flexible magnetic disk 20 (see FIGS. 1 and 13) is rotatably disposed in the cartridge 10, and an access opening 22 is provided in the front edge of the cartridge 10 for receiving a pair of magnetic heads 24 and 26 (see FIG. 4). The heads 24 and 26 may be suitably mounted on spring support arms 28 and 30, for example, and these may be moved in unison in direction A in order to move the heads 24 and 26 radially on disk 20. Any suitable means may be provided for moving heads 24 and 26 off of or into contact with the disk 20 once the heads 24 and 26 have entered the opening 22.

A dust door 32 (see FIGS. 1–3) is swingably mounted on a shaft 34 extending into and through the cover halves 10A and 10B, and a torsion spring 36 extends around shaft 34. The spring 36 has one end fixed with respect to the cartridge 10 and has its other end embedded in the door 32 so that it tends to swing the door 32 into a closed position in which the door closes the access opening 22 for thus shielding the disk 20.

The disk 20 is disposed on a hub assembly 40 (see FIGS. 4 and 10), and the hub assembly 40 protrudes into a central opening 42 in the upper cover half 10A and into a central opening 44 in the bottom cover half 10B. As will be noted from FIG. 4, the opening 44 in the cover half 10B is slightly smaller in diameter than the opening 42 in the top cover half 10A.

Figure 3:
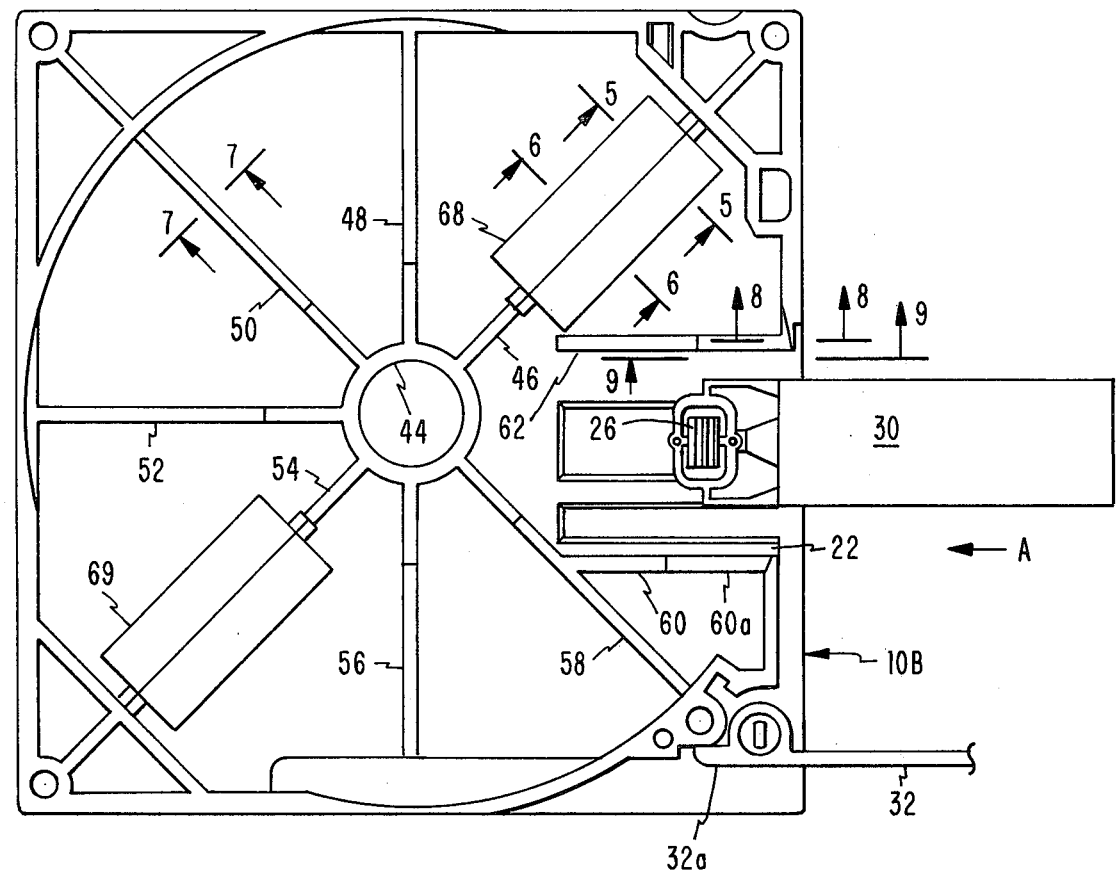
FIG. 3 is a top plan view of the lower cover half of the cartridge and taken on line 3—3 of FIG. 1.

The bottom cover half 10B, as will be seen from the plan view of this cover half in FIG. 3, has a plurality of radially extending internal ribs 46, 48, 50, 52, 54, 56 and 58. In addition, the bottom cover half 10B has sidewardly extending internal ribs 60 and 62, and these form a half of the access opening 22. In this connection, the lower magnetic head 26 and its support 30 is shown in FIG. 3 within the opening 22.

Figure 5:
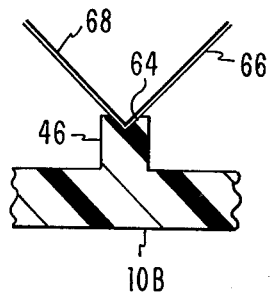
FIG. 5 is a sectional view on an enlarged scale and taken on line 5—5 of FIG. 3.

The rib 46 as shown in FIG. 5 is formed with a V-shaped slot 64 in its upper edge. A piece 66 of flexible Mylar (registered trademark of E. I. dePont de Nemours & Co.) film or the like is disposed in slot 64, and a thickness of porous fibrous paper wipe 68 is disposed on top of the film 66. The wipe 68 and the film 66 are fixed within the slot 64 to the rib 46 by any suitable means, such as by heat welding; and, when the bottom cover half 10B is divorced from the upper cover half 10A, the film 66 and wipe 68 extend upwardly in the form of a V as is shown in FIG. 5.

A wipe 69 (see FIG. 3) similar to the wipe 68 and also supported by a piece of Mylar film is fixed to the rib 54 in the same manner as the wipe 68 is fixed to the rib 46, using heat welding and the same type of V-shaped slot as shown in FIG. 5. The other radial ribs 48, 50, 52, 56 and 58 serve mainly to strengthen the bottom cover half 10B.

It may be noted that the top and bottom cover halves 10A and 10B are mirror images of each other except for the fact that the central holes 42 and 44 are different diameters as previously noted and except for the existence of the slot 18 which is only in the bottom cover half 10B. With the top and bottom cover halves 10A and 10B being assembled as shown in FIG. 1, therefore, there are internal ribs in the top cover half 10A in exact alignment with the ribs 46–62 previously described in connection with the bottom cover half. Two such ribs 70 and 72 within the upper cover half 10A are shown in FIGS. 6 and 7 which depict the cartridge in assembled condition.

Figure 6:
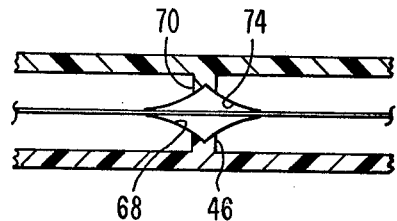
FIG. 6 is a sectional view of substantially the same type as FIG. 5 and taken on line 6—6 of FIG. 3 but with the top cover half and the disk in place on the lower cover half to complete the cartridge and showing dusting fabric for the disk and fixed within the cartridge.
Figure 7:
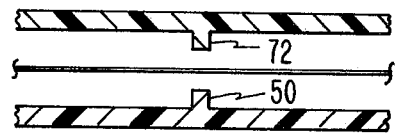
FIG. 7 is a sectional view of the cartridge including both halves and taken on line 7—7 of FIG. 3.

The rib 70 shown in FIG. 6 carries a porous paper wipe 74 anchored with respect to the rib 70 in the same manner as the wipe 68 is anchored to the rib 46 and backed by a piece of flexible film identical with the film 66 shown in FIG. 5. The Mylar film piece 66 and the corresponding film piece supporting the wipe 74, as well as the wipes 68 and 74 themselves, are bowed in shape by reason of being in contact with the disk 20 in the assembled condition of the cartridge 10 as shown in FIG. 6. The wipe 69 and the corresponding wipe carried by a rib in the upper cover half 10A located opposite the rib 54 also are bowed in the same manner as shown in FIG. 6 so that these wipes are in contact with the disk 20. This bowing is against the inherent resilience of the pieces of Mylar film so that the wipes 68 and 74, for example, bear with resilient pressure on opposite faces of the disk 20. The other radially extending ribs, such as the ribs 50 and 72, are spaced from each other and from the disk 20 as is illustrated in FIG. 7.

Figure 8:
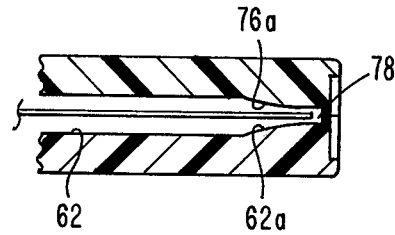
FIG. 8 is a sectional view of the cartridge including both halves and taken on line 8—8 of FIG. 3.
Figure 9:
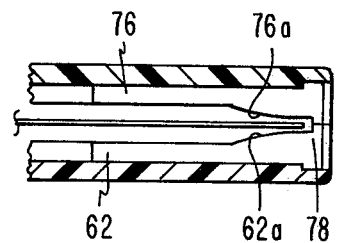
FIG. 9 is a sectional view of the cartridge including both halves and taken on line 9—9 of FIG. 3.

Referring to FIGS. 8 and 9, it will be observed that the rib 62 has a terminating portion 62a of increased height, and the corresponding rib 76 of the top cover half 10A has a corresponding portion 76a of increased height. The rib portions 62a and 76a thus form a relatively narrow slot 78 for receiving the edge of the disk 20. The rib 60 likewise has an increased height portion 60a, and the rib 60 and the corresponding rib of the top cover half 10A thus provide a slot of the same type as the slot 78 for likewise receiving the marginal edge of the disk 20. The disk 20 is thus guided at the sides of the access opening 22 quite accurately in a median position, equally spaced from the adjacent inner surfaces of the cover halves 10A and 10B forming the major surfaces of the access opening 22.

Figure 11:
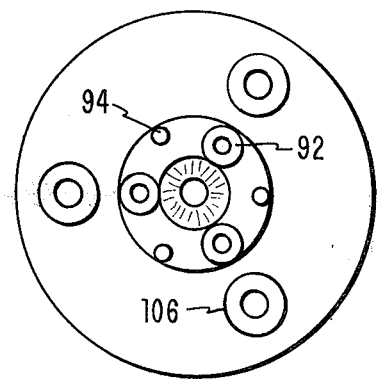
FIG. 11 is a top plan view on an enlarged scale of a central part of the hub assembly and taken from line 11—11 of FIG. 10.
Figure 10:
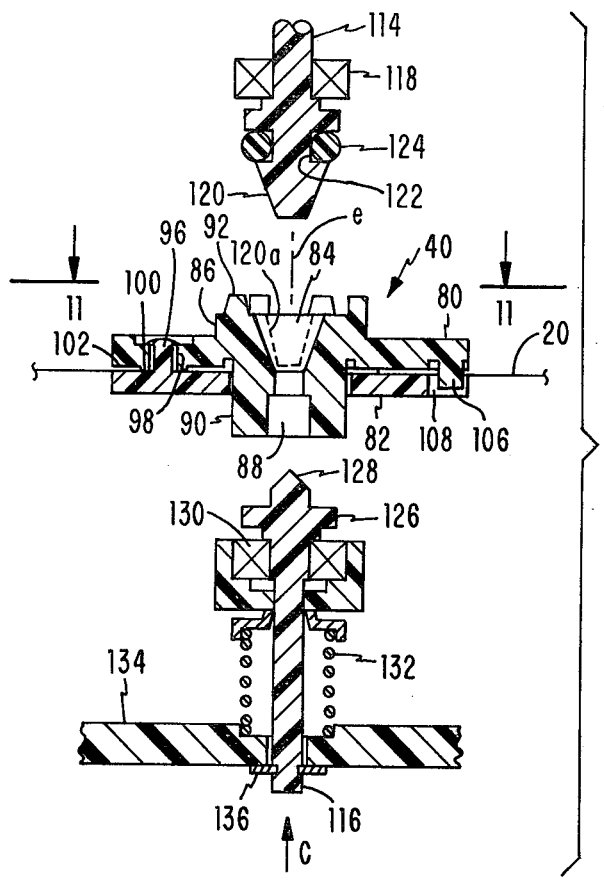
FIG. 10 is a longitudinal sectional view of a hub assembly for the magnetic disk and showing in exploded relationship a drive member and a backing member for the hub assembly.

The hub assembly 40 is shown in detail in FIGS. 4 and 10 in particular and may be seen to comprise a hub 80 and a collar 82 positioned on the hub 80. The hub 80 is formed with a conical central cavity 84 disposed mainly in an upwardly extending hub portion 86 as the assembly 40 is shown in these figures and is formed with a cylindrical central opening 88 connected with the opening 84 and disposed mainly in a downwardly depending hub portion 90. Three round tapered bosses 92 (see FIG. 11) extend upwardly from the hub portion 86, and the inner surfaces of the bosses 92 are substantially in correspondence with the outer upper edge of the opening 84. Three smaller round bosses 94 extend upwardly from the hub portion 86 and are interspersed between the bosses 92, and the bosses 94 have their outer surfaces substantially in correspondence with the outer surface of the hub portion 86.

The collar 82 has three rivet portions 96 extending through three corresponding holes 98 formed in the hub 80. The hub 80 is provided with an annular boss portion 100 surrounding each of the holes 98, and the rivet portions 96 are formed over the hub 80 so as to tightly hold the collar 82 in contact with the portions 100 for fixing the collar 82 and hub 80 together. Due to the existence of the boss portions 100, the collar 82 and hub 80 have a gap 102 between them, and the disk 20 is disposed in the gap 102. The disk 20 (see FIG. 14) has three openings 104 through it for receiving the boss portions 100, and the openings 104 are slightly greater in diameter than the diameters of the boss portions 100 so that the disk 20 may move slightly radially with respect to the hub 80 and boss portions 100. The thickness of the gap 102 is slightly greater than the thickness of the disk 20 so that the disk 20 may also have a slight movement axially with respect to the hub 80.

The hub 80 is provided with a lug portion or pin 106 that extends downwardly as the assembly 40 is shown in FIG. 10 and into a slot 108 in collar 82 that is substantially greater in size than the lug portion 106 so that the lug portion 106 is out of contact with the faces of the collar 82 forming the sides of the slot 108. The disk 20 as seen in FIG. 14 has an opening or hole 110 through which the lug portion 106 extends, and the lug portion 106 has a flat driving face 106a which coacts with a flat edge 110a of the hole 110 which functions as an abutment for driving the disk 20.

Figure 14:
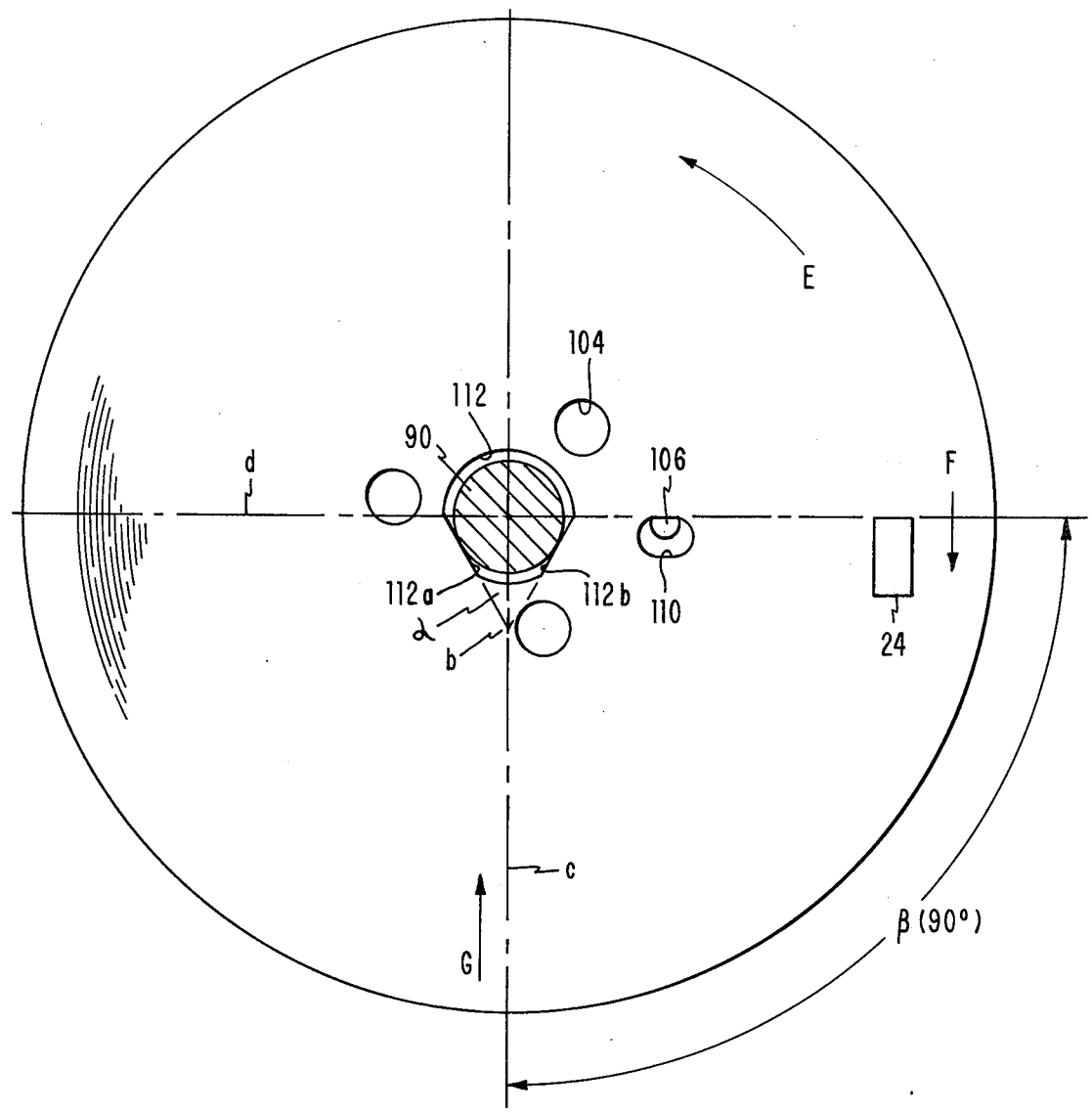
FIGS. 14 and 15 are top plan views of the magnetic disk showing the central hub of the hub assembly in different relative positions with respect to the disk.

The disk 20 is provided with a center opening or hole 112 through which the hub portion 90 extends (see FIG. 14). The hole 112 is arrow shaped and has two straight sides 112a and 112b adapted to contact the hub portion 90 which is round, and the sides 112a and 112b extend at an angle $\alpha$ with respect to each other. The angle $\alpha$ may, for example, be 60 degrees and may well be in the range of 75 degrees $\pm$ 45 degrees. The apex b of the angle $\alpha$ is located on a radial line c extending through the center of disk 20 which is disposed at an angle $\beta$ of preferably 90 degrees or thereabouts with respect to a radial line d of the disk 20 extending through the edge 110a of hole 110, as shown in FIG. 14.

The hub assembly 40 and thus the disk 20 are driven from the rotatable drive member or spindle 114 (see FIG. 10), and the hub assembly 40 is held in forceful contact with the drive member 114 by means of a backing member 116. The drive member 114 is rotatably disposed in a bearing 118 and is rotatably driven from any suitable prime mover (not shown). Suitable supporting structure for bearing 118 and drive member 114 is provided so that member 114 remains fixed from lateral movement with respect to the longitudinal center line e of the drive member 114 as member 114 is driven. The drive member 114 has a conical forepart 120 which fits in the conical cavity 84 in the assembly 40 as is indicated in dotted lines by the reference numeral 120a. The forepart 120 is slightly less tapered than the walls of the cavity 84 so that the forepart 120 engages the walls of the cavity at the extreme end of the forepart substantially in the plane of the disk 20. This construction assures that the disk is exactly centered with respect to center line e even though manufacturing tolerances militate against a perfect fit of tapered forepart 120 in conical cavity 84.

The forepart 120 of the drive member 114 is provided with a circumferential groove 122, and a rubber O-ring 124 is disposed in the groove 122 and extends slightly outwardly from the exterior surface of the forepart 120. When the forepart 120 of drive member 114 is fully positioned within the conical cavity 84 and is in its dotted line position 120a, the O-ring 124 is slightly compressed by the bosses 92 and therefore forms a driving connection between the drive member 114 and the hub portion 86.

The backing member 116 includes a disk portion 126 adapted to bear on the lower surface of the hub 80, and the backing member 116 has a tapered boss 128 which enters the opening 88. Rotation of the backing member 116 is permitted by means of a bearing 130 in which the backing member 116 is disposed, and a spring 132 is disposed between the bearing 130 and a frame member 134. A retaining washer 136 is fixed on the lower end of the backing member 116 as it is illustrated in FIG. 10 and prevents the backing member 116 from separating from the frame member 134. It will be observed that there is a gap between the backing member 116 and the opening through the frame member 134 through which the backing member 116 extends so that there can also be a slight lateral movement of the backing member 116 with respect to the frame member 134.

Figure 2:
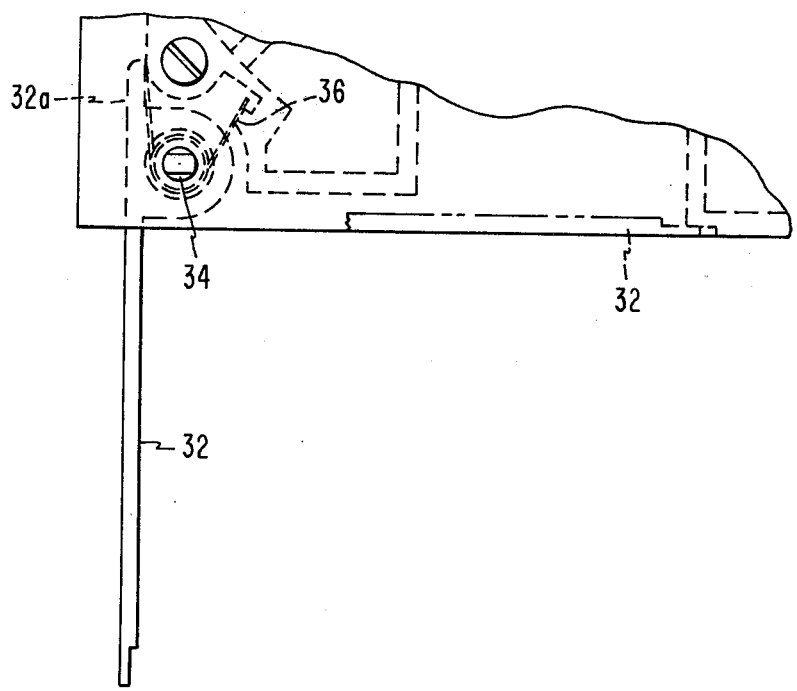
FIG. 2 is a fragmentary top plan view of the cartridge showing the door in open position.

When the cartridge 10 is in its free condition, outside of a disk drive containing the drive member 114 and backing member 116, the spring 36 holds the dust door 32 in closed position (as shown in dotted lines in FIG. 2). The door 32 thus closes the access opening 22 of the cartridge and seals the disk 20. The cartridge 10 and particularly its cover halves 10A and 10B is made from a hard tough material, such as polycarbonate, and the cartridge and particularly the cover halves thus provide protection for the disk 20 which is relatively fragile. More particularly, the disk 20 may be of polyethylene terephthlate, such as of 0.003 inch (0.0762mm) thickness, being a so called "floppy" disk which has many advantages but is relatively flexible, flimsy and easily damaged. The door 32 when in closed position prevents dust from collecting on the surfaces of the disk 20 and prevents any fingering of the disk 20 which would leave finger marks, preventing effective subsequent magnetic reading or writing on the disk. The hub assembly 40 effectively positions the disk 20 in the cartridge 10 so that the edges of the disk 20 cannot come into contact with any internal surfaces of the cartridge 10. The hub portion 90 fits loosely within the opening 44 in the bottom cover part 10B and prevents only a limited sideward movement of the hub assembly 40 and disk 20 with respect to the bottom cover part 10B. The hub portion 86 and particularly the bosses 94 may contact the sides of the hole 42 in the top cover part 10A and thus limit the sideward movement of the hub assembly 40 and disk 20 to a limited distance with respect to the top cover part 10A. Also, it will be observed from FIG. 4 in particular that the axial movement of the hub assembly 40 is limited in the cartridge by the collar 82 contacting an adjacent inner surface of the bottom cover half 10B and by the hub 80 contacting an adjacent inner surface of the top cover half 10A. Thus, an axial push on the hub assembly 40 will not allow a strain to be put on the disk 20 or a radial push on the hub assembly 40 will not allow damage to the periphery of the disk 20. The cartridge 10 with the disk 20 therein may thus be stored, handled and moved about with the disk 20 being protected from damage throughout.

The cartridge 10 having the disk 20 therein may be moved into a disk drive (not shown) by utilizing forceps (not shown), for example, entering the notches 12 and 14 so as to slide the cartridge 10 moving in direction D as shown in FIG. 1 into the disk drive. It is contemplated that the disk drive preferably shall have a stationary rib for entering the slot 18, and the rib as the cartridge 10 is moved in direction D into the disk drive, shall contact the short end 32a of the door 32 so as to pivot the door 32 into its open position in which it is shown in full lines in FIG. 2. The dust door 32 thus opens the access opening 22 when the cartridge 10 is thus positioned in a receiving disk drive. It is contemplated also that the disk drive shall preferably have a spring loaded detent ball or roller entering the cavity 16 and holding the cartridge 10 in its fully loaded position within the disk drive.

The disk drive also includes the magnetic heads 24 and 26 on their spring support arms 28 and 30 (see FIG. 4) which may move in direction A into the access opening 22 after the cartridge 10 has been moved into final position in the disk drive. The magnetic heads 24 and 26 are spaced with respect to each other and then may be moved into contact with the disk 20 by any suitable mechanism. The increased height rib portions 62a and 76a (see FIG. 8) forming the slot 78 on one side of the access opening 22 and the corresponding increased height rib portion 60a and its corresponding rib portion carried by the top cover half 10A hold the disk 20 within close limits with respect to a median position in the access opening 22 so as to assure that the heads 24 and 26 do not abut the peripheral edge of the disk 20 as the heads 24 and 26 are moved into the access opening 22.

Figure 12:
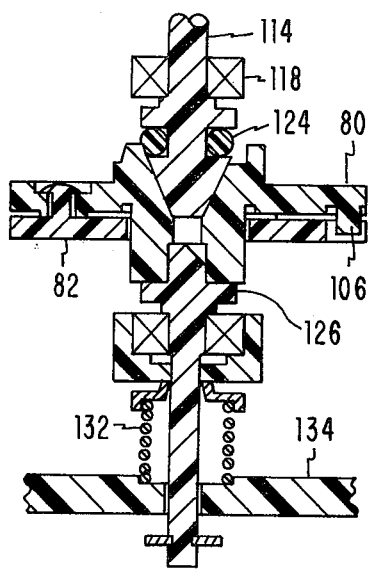
FIG. 12 is a view similar to FIG. 10 but showing the hub assembly, drive member and backing member together in cooperative driving relationship.

With the cartridge 10 thus being in position in the disk drive, the cartridge 10 and backing member 116 may be moved in direction C so that the forepart 120 of the drive member 114 fits in the conical cavity 84 and so that the part 126 of the backing member 116 is in spring pressed abutment with the lower surface of the hub 80. The spring pressed backing member 116 thus firmly holds the tapered forepart 120 of the drive member 114 in the cavity 84 and causes a continued indentation of the O-ring 124 by the bosses 92 so that the O-ring 124 and bosses 92 form a non-slip driving connection from the drive member 114 to the hub assembly 40. The drive member 114 is then rotatably driven from its prime mover and thus drives the hub assembly 40 and disk 20. The hub assembly parts are then in their FIG. 12 positions.

When the disk 20 is rotatably driven by the hub assembly 40, the opposite wipes 68 and 74 (see FIG. 6) are in friction contact with the disk 20. The same is true of wipe 69 (see FIG. 3) on the rib 54 and the wipe carried by the top cover part 10A located opposite the wipe 69. These wipes thus function as mechanisms for removing and wiping off contaminants from the disk 20 and capturing these contaminants. The wipes have low friction with respect to the disk 20, but they are held in bearing contact with the disk 20 due to the action of the resilient Mylar backing 66 for the wipe 68 and the corresponding Mylar backings for the other wipes. These wipes (68, 68a, 74 etc.) therefore also act as means restraining the rotation of the disk 20 to some slight extent. Likewise, the magnetic heads 24 and 26 when they are in contact with the disk 20 for a magnetic reading or writing action also to some extent restrain the rotation of the disk 20. For these purposes, it is preferred that the wipes shall be of a porous low friction fibrous material such as, for example, the dusting fabric which is manufactured by the Kendall Company of Boston, MA. and is designated H854, Novonette #1. Obviously other wipes may be used, such as, for example, the 3M 550 wipe made by the Minnesota Mining & Manufacturing Company, generally known in the art as "pink wipe". Although the use of Mylar backing 66 for the wipe 68 and the corresponding Mylar backings for the other wipes is preferred, these backings may be omitted. In this case, the wipes 68 etc. are directly fastened within the V-shaped groove 64 and the corresponding grooves in the other ribs of the cover halves 10A and 10B carrying the other wipes. Generally the wipes without such Mylar backings are sufficiently resilient so as to continue to bear on the disk 20 as it rotates, functioning in the same manner to capture contaminants from the disk and to slightly restrain the disk in its rotation.

As has been previously described, the boss portions 100 (see FIG. 10) fit loosely within the disk openings 104, and the lug portion 106 fits loosely in the disk opening 110. Also, it can be expected that the edges 112a and 112b of the opening 112 are not in contact with the hub portion 90 initially. Therefore, under these conditions, even though the hub assembly 40 and particularly the hub 80 is held in fixed centralized location with respect to the drive member 114 due to the action of the tapered forepart 120 acting on the walls of the conical cavity 84, the disk 20 will not be centralized in fixed position laterally with respect to the fixed center line e of the drive member 114.

The disk 20 is accurately centered with respect to the drive member 114 when the acutely extending hole edges 112a and 112b are both in contact with the round hub portion 90; and the lug portion 106 of the hub 80, in turning the disk 20 against the restraining action of the wipes 68, 69, 74 etc. and against the restraining action of the magnetic heads 24 and 26, causes the disk 20 to shift laterally to move both of edges 112a and 112b into contact with the hub portion 90. In this movement of the disk 20, one or both of the edges 112a and 112b may slide on the round periphery of the hub portion 90; and the edges 112a and 112b and the periphery of the hub portion 90 thus act as camming surfaces in this action. With the edges 112a and 112b thus both being moved into contact with the hub portion 90, the disk 20 is then centralized with respect to the hub assembly 40 and also with respect to the longitudinal center line e of the drive member 114.

Figure 15:
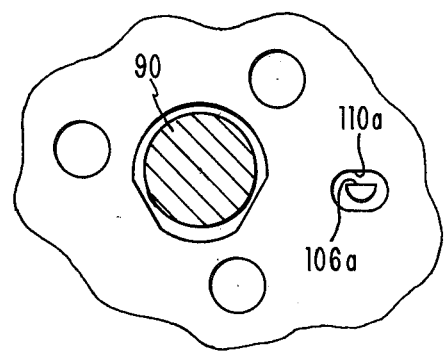

FIGS. 14 and 15 may be referred to for an understanding of the manner in which the lug portion 106 of the hub 80 moves the disk 20 laterally to move both hole edges 112a and 112b into contact with the hub portion 90 so as to thereby center the disk 20. The disk 20 is rotated in the direction E shown particularly in FIG. 14, and initially the lug portion 106 of the hub 80 may be assumed to be out of engagement with the sides of the hole 110 in the disk 20 and the hole edges 112a and 112b may be assumed to be out of contact with the hub portion 90 as shown in FIG. 15. As the lug portion 106 rotates along with the hub assembly 40 from the drive member 114, the restraint on the disk 20 due to the wipes including the wipes 68, 69, 74 etc. and due to the magnetic heads 24 and 26 in contact with the disk 20 is opposite to direction E. The head 24 is shown in FIG. 14, and the force F of restraint due to head 24 is shown in this figure. At this time, the lug portion 106 and particularly its flat surface 106a moves into contact with the flat edge portion 110a of the hole 110 in the disk 20, and the resultant of the force applied by the lug portion 106 on the disk 20 and of the restraint in the direction F provided by the magnetic heads 24 and 26 is a force in the direction G shown in FIG. 14. Since the force in the direction G is nearly diametrically opposite the apex b in the disk 20, the disk 20 shifts laterally until its hole edges 112a and 112b are in contact with the round hub portion 90 as shown in FIG. 14.

The head 24 is shown in FIG. 14 substantially on the same radial line d as the engaging surfaces 106a and 110a, and it will be apparent that the result of the force by the lug portion 106 and the restraining force by the heads 24 and 26 is a couple which acts in the direction G to move the hole edges 112a and 112b into engagement with the hub portion 90. The restraining effect of the heads 24 and 26 acting in conjunction with the propelling effect by the lug portion 106 rotating in direction E varies from translation in the direction G to couples tending to move disk 20 in the direction G or to engage one or the other of the hole edges 112a and 112b with hub portion 90 and tending to move the disk 20 along these edges on hub portion 90 toward the apex b, depending on the position of the heads 24 and 26 at the time with respect to the lug portion 106. Although the restraining effect of the heads 24 and 26 has just been specifically referred to, the restraining effect of the wipes 68, 69, 74, etc. on the disk 20 in centralizing the disk 20 with respect to the hub portion 90 is the same as for heads 24 and 26, and it will be apparent that the centralizing effects of the heads 24 and 26 and of the wipes 68, 69, 74, etc. are all simultaneously operative and cumulative for this purpose. The wipes 68, 69, 74, etc. are fixed radially with respect to the center of the disk 20, while the heads 24 and 26 may move inwardly and outwardly radially of the disk for reading and writing on the various magnetic tracks of the disk so that the heads are not effective on the same radius of the disk all of the time. It is important, however, that the restraint on the disk 20 be provided at a greater radius of the disk than that at which the lug portion 106 is disposed in order to provide the translation and couples just described; and the wipes 68, 69, 74, etc. are located at greater radii than the lug portion 106, and the same is true of the heads 24 and 26, although the radius at which the heads 24 and 26 are located varies.

The angle α at which the hole edges 112a and 112b extend with respect to each other may vary while still obtaining the disk centralizing action as above described. The lower limit of the angle α cannot be exactly defined and is dependent upon the strength of the material of the disk 20. Making the angle α quite small will tend to cause the disk 20 to be split as the disk 20 is moved in direction G and will also tend to cause ripples in the disk material at the edges of the hole 112. If the disk 20 is constructed of Mylar of 0.003 inch (0.0762mm) thickness, a good lower limit for the angle α can be expected to be about 30 degrees. A useable upper limit for the angle α can be that angle at which any of the restraints on disk rotation, due to the wipes 68, 69, 74, etc. or due to the heads 24 and 26, tends to cause the hole edges 112a and 112b to move in a direction opposite to the direction G for any particular rotative position of the disk 20 with respect to the particular restraint. The angle α using this criteria, could have an upper limit of 120 degrees. It will be understood, however, that the restraints on disk rotation by the wipes 68, 69, 74, etc. and the heads 24 and 26 are cumulative, and therefore the resultant cumulative action may actually have a resultant tending to move the disk to engage hole edges 112a and 112b with hub portion 90 and hold them in engagement even though the effect of one of the restraints is the opposite (with less than optimum choice of angles α and β).

The optimum angle β of the radial line d passing through the hole drive edge 110a and measured from the radial line c passing through the apex b is 90 degrees (see FIG. 14), and this is in the direction of rotation E of the disk 20. An analysis indicates that the angle β between the radial lines d and c should preferably be close to this value. The extent to which the angle β of 90 degrees may well be changed will depend on the coefficients of friction between the materials of the disk 20 and the hub portion 90.

Due to the accuracy with which the disk 20 is centered with respect to the center e of the drive member 114, the track density radially of the disk may be high. For example, 125 tracks per inch (4.92 tracks per millimeter) are recordable on a disk 20. This compares with 48 tracks per inch (1.88 tracks per millimeter) recordable in previous "floppy" disks which were not centered with the same accuracy as is obtained using the present invention. Not only can the number of tracks per inch or per millimeter radially be increased, but the recording density may be substantially higher than previously. Therefore, a small disk 20 of only 3.3 inches (84mm) diameter can carry 500,000 bytes on its two sides. This compares with 500,000 bytes carried on the two sides of a prior art floppy disk of 7⅞ inches (200mm) diameter. It may be noted that the conical forepart 120 of the drive member 114 engaging the hub assembly 40 in the conical cavity 84, together with the arrangement of the arrow shaped hole 112 cooperating with the round hub portion 90, provide the disk centralizing precision necessary to enable a disk 20 "written" on any disk drive including these parts to in turn be "read" on any other disk drive including these parts, even though the magnetic tracks are very closely spaced on radial lines of the disk 20.

In brief recapitulation, it is believed apparent that the high accuracy of centering of the disk 20 is obtained partially due to the fact that the disk 20 is loosely mounted with respect to the hub assembly 40 and thus with respect to the center line e of the drive member 114. The latter is true since the boss portions 100 fit loosely in the disk holes 104, since the center hole 112 of the disk 20 is considerably larger than the hub portion 90 and since the driving lug portion 106 of the hub 80 is considerably smaller than the hole 110 through which it extends. It should thus be noted that the disk 20 and hub assembly 40 "free float" within the cartridge 10. Since the cartridge 10 is firmly located within a disk drive in usage, the free floating assembly 40 permits its engagement with the drive member 114 and backing member 116 without causing any high driving torque. This high accuracy of centering of disk 20 is also due to the fact that the center hole 112 of the disk 20 is of non-round configuration and since it in particular is arrow shaped and has the edges 112a and 112b that extend at the acute angle α toward each other and since the angle β between the radial line d on which drive takes place and the radial line c on the apex of disk center hole 112 is about a right angle. The driving lug portion 106 of the hub 80 is spaced by the angle β from the apex angle α of the edges 112a and 112b in order to provide the couples and translation forces on the disk 20 as above described.

It may also be mentioned that the loose mounting of the disk 20 on the hub assembly 40 has a particular advantage with a "floppy" type of disk being used, such as of Mylar of 0.003 inch (0.0762mm) thickness. This type of material expands differently on axes at 90 degrees to each other with increases in temperature and also expands differently along these axes with changes in humidity, since the material is hygroscopic. Therefore, it is not very satisfactory to clamp such a disk in place, such as on a hub assembly corresponding to the hub assembly 40, since with these changes in dimensions with changes in temperature and humidity, the disk does not stay in a single plane. The disk develops shallow ribs and grooves and has an "oil canning" function. Thus, magnetic heads, such as heads 24 and 26, cannot stay in contact with the disk during rotation and very unsatisfactory operation with loss of bits would result. The loose mounting of the disk 20 on the hub assembly 40 prevents any such "oil canning" function and the resultant loss of bits, since the disk 20 can expand and contract as it will with changes in temperature and humidity without a fixing of the disk 20 at its center causing any resultant buckling in the disk 20 to occur.

Since the cartridge 10 is of relatively rigid material and since it includes the door 32; the disk 20, which is relatively fragile, is protected from physical damage as well as from dust and fingerprints due to handling. Assuming that the disk 20 is relatively small, such as of a diameter of 3.307 inches (84mm), the cartridge may be correspondingly small, such as 3.5 inches (89mm) square. This small cartridge may be conveniently stored and transported and indeed is so small that it can be carried in the pocket of an ordinary man's shirt. The cartridge 10 with the disk 20 and hub assembly 40 within it are correspondingly light in weight.

Figure 16:
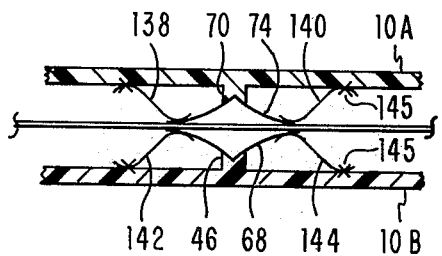
FIG. 16 is a sectional view similar to FIG. 6 and showing additional pressure applying means for the dusting fabric.

FIG. 16 is a view similar to FIG. 6 and showing a modified arrangement for pressing the wipes 68 and 74 onto the surfaces of the disk 20. In the wipe arrangement of FIG. 16, the Mylar backings 66 are dispensed with; and springs 138, 140, 142 and 144 are provided to be effective on the wipes 68 and 74 as shown in this figure. The springs press the wipes into friction contact with the disk 20 so that they function as previously described in wiping debris off of the faces of disk 20 and in retarding the rotation of disk 20 so that the edges 112a and 112b of the arrow shaped hole 112 seat on the round hub portion 90 for accurately centering the disk with respect to the hub assembly 40. The springs 138, 140, 142 and 144 are fixed, such as by heat staking, at their side edges 145 with respect to internal surfaces of the top and bottom cartridge halves 10A and 10B.

Figure 17:
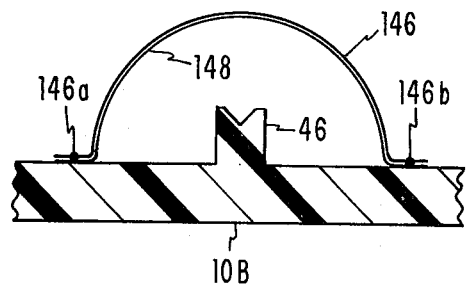
FIG. 17 is a view similar to FIGS. 6 and 16 and showing a still further modified dusting fabric arrangement for the disk.

FIG. 17 shows still another form of disk wiping arrangement, particularly in connection with the rib 46. In the FIG. 17 arrangement, the rib 46 is not used for anchoring a wipe, but instead the wipe 146 bridges across and is out of contact with the rib 46. The wipe 146 is supported by a plastic film 148, such as of Mylar, and both the wipe 146 and the film 148 are heat welded at their side edges as at 146a and 146b with respect to the cover half 10B. The other wipes in the cartridge 10 may be of the same form as the wipe 146 and supported by a Mylar film strip similar to the strip 148. The resilience of the strip 148 and its counterparts for the other wipes holds the wipes in friction contact with the disk 20 during its rotation.

Figure 18:
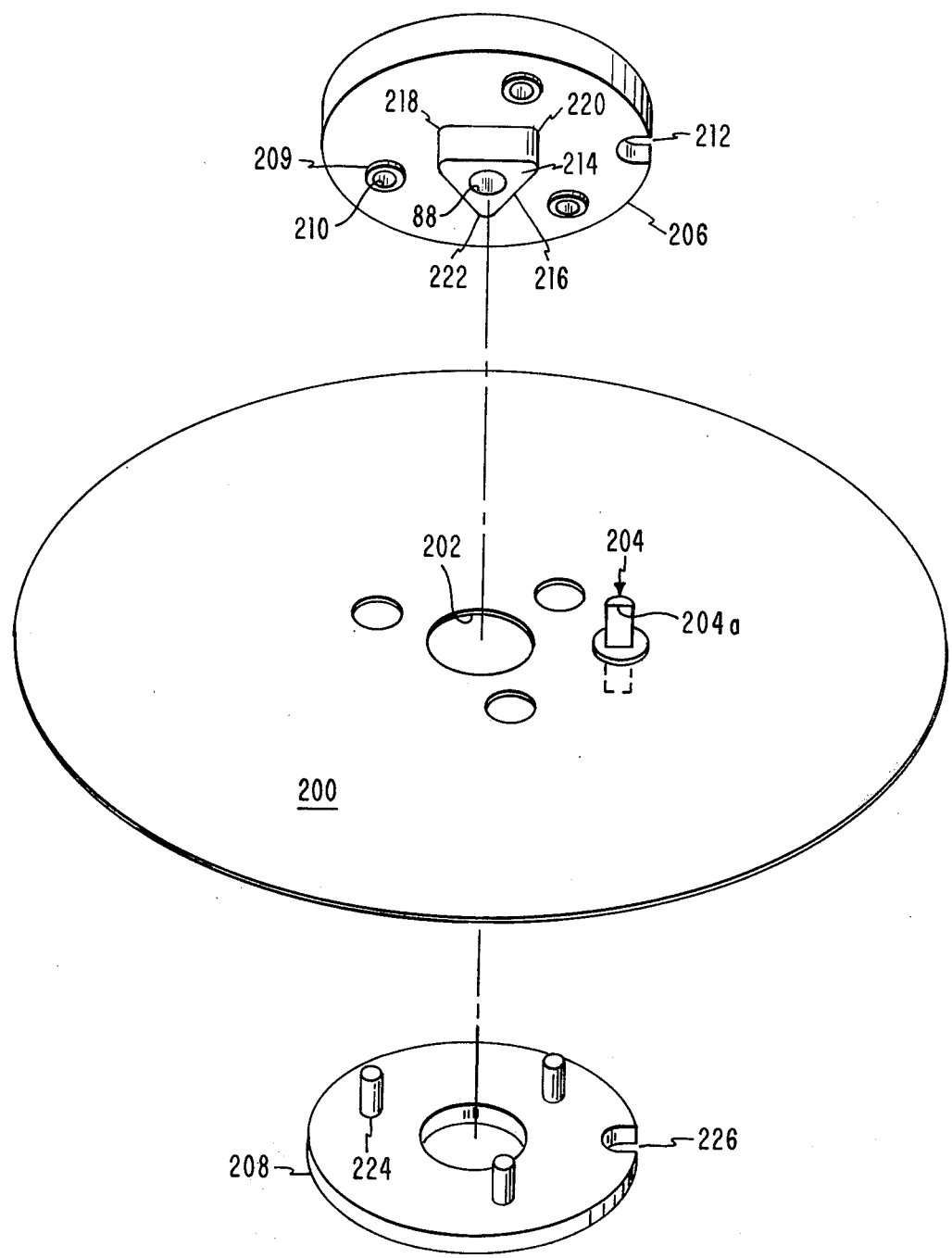
FIG. 18 is an exploded view of a modified disk and a modified hub assembly and showing a top view of the disk, a bottom view of the hub part of the hub assembly at the top of the figure and a top view of the collar part of the hub assembly at the bottom of the figure.
Figure 19:
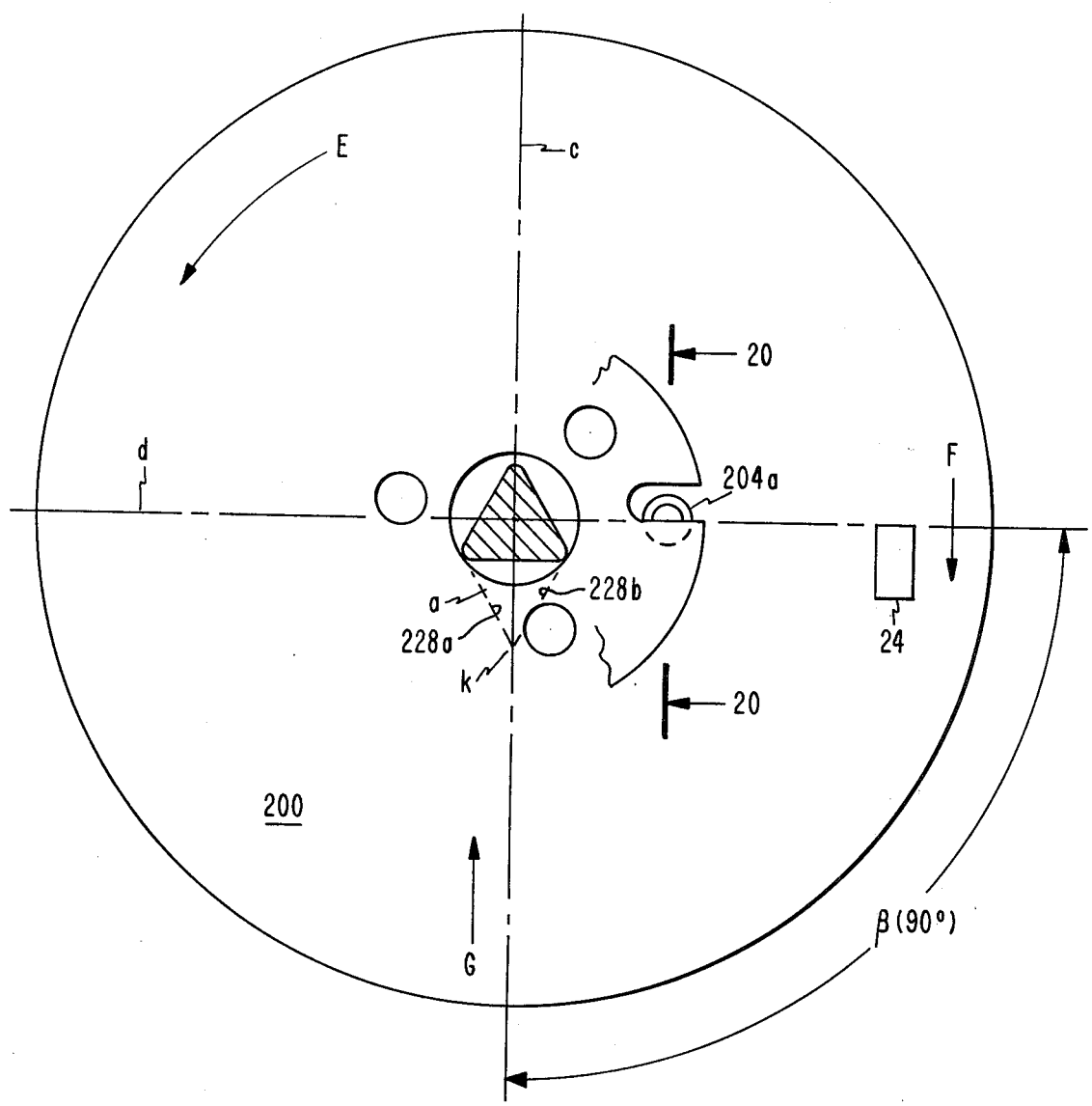
FIG. 19 is a top plan view of the modified disk shown in FIG. 18 and having a hub portion extending through the central hole of the disk.
Figure 20:
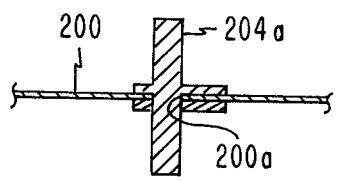
FIG. 20 is a sectional view of an enlarged scale taken on line 20—20 of FIG. 19.

The modified disk 200 shown in FIGS. 18-20 takes the place of the previously described disk 20 in the cartridge 10 and has a round central hole 202 in lieu of the non-round hole 112 in the disk 20 and has a drive pin 204 extending through a hole 200a therethrough and fixed therein and which is used in lieu of the drive hole 110 in the disk 20.

The hub assembly for the modified disk 200 and shown in FIG. 18 includes a hub 206 taking the place of the hub 80 and a collar 208 taking the place of the collar 82. The hub 206 includes boss portions 209 similar to the boss portions 100 and surrounding holes 210 similar to the holes 98. The hub 206 has no pin 106 and instead has a peripheral slot 212. The hub 206 has a downwardly extending hub portion 214, and the hub portion 214 is non-round as contrasted to the round hub portion 90. The hub portion 214 has three flat sides 216 disposed between rounded protuberant portions 218, 220 and 222.

The collar 208 has rivet portions 224 corresponding to the rivet portions 96 that extend through the holes 210 in the hub 206 for the purpose of fixing the hub 206 and collar 208 together so that the disk 200 is captured between the hub 206 and collar 208 and may have a limited movement with respect to them in the same manner that the disk 20 may have such limited movement in the hub assembly 40. The collar 208 is provided with a slot 226 that is in alignment with the slot 212 and with the pin 204 when the assembly of the hub 206, the collar 208 and the disk 200 is complete by virtue of the rivet portions 224 being riveted over the hub 206. The hub 206 may be provided with the same conical cavity 84 (see FIG. 10), and the hub portion 214 may be provided with the same central opening 88 with which the hub 80 is equipped so that the assembly of the disk 200, the collar 208 and hub 206 may be supported by drive member 114 and backing member 116 in the same manner as the assembly 40.

The pin 204 may be riveted through hole 200a in the disk 200 as is shown in FIG. 20 and occupies the same position in the disk 200 as is occupied by the drive hole 110 in the disk 20. The pin 204 has flat drive surfaces 204a that may contact corresponding flat sides of the slots 212 and 226 when the disk 200, the hub 206 and collar 208 are in assembly.

In the operation of the modification shown in FIGS. 18-20, the disk 200 is driven in direction E by virtue of the pin 204 and particularly its flat surfaces 204a driven by flat side surfaces of the hub 206 and collar 208 forming the slots 212 and 226. The restraint on the disk 200 is the same as on the disk 20 such as in direction F by heads 24 and 26. The pin 204 is located farther inwardly toward the center of the disk 200 than are the wipes 68 etc. and heads 24 and 26, and the resultant force on the disk 200 such as in the direction G is the same as for the disk 200. It is immaterial that the pin 204 carried by the disk 200 is used in lieu of the lug portion 106, and in fact the lug portion 106 may be used in the embodiment of FIGS. 18-20 and the pin 204 may be used in lieu of the lug portion 106 in the first described embodiment. The forces of the disk 200 due to the restraint on the disk 200 by the heads 24 and 26 and the wipes 68, etc. in the direction G for example move the disk 200 upwardly as it is illustrated in FIG. 20 so that the edges of the round central hole 202 make contact with the rounded protuberances 218 and 220 on the hub portion 214.

As illustrated in FIG. 19, the tangents of the rounded protuberant portions 218 and 220 at the points where they contact the edges of the round disk hole 202 are the tangents 228a and 228b. These tangents 228a and 228b have the angle a between them corresponding to the angle $\alpha$ between the straight edges 112a and 112b of the central hole 112 in the disk 20. The apex k of the angle a is on the radial line c, and this radial line is at the same angle $\beta$ preferably of 90 degrees with respect to the radial line d which extends through the flat surfaces 204a of the pin 204. If the lug portion 106 were used in lieu of the pin 204, the radial line d would extend through the flat lug portion 106a in the same manner as is shown in FIG. 14 for the disk 20.

The centering action and mechanism for the disk 200 is substantially the same as that for the disk 20. For the disk 200, of course, the round central hole 202 is used in lieu of the round hub portion 90, and the non-round cooperating portion is the non-round hub portion 214 used in lieu of the non-round disk hole 112 in the first embodiment. For the centering action of the disk 200, the transverse distance between the points at which the rounded protuberances 218 and 220 contact the edges of the round hole 202 should be slightly less than the diameter of the hole 202 so that the rounded protuberances 218 and 220 may ride up the edges of the hole 202 with the disk 200 tending to move in the direction G on the hub portion 214.

It will thus be apparent that the tangents 228a and 228b correspond to the flat edge portions 112a and 112b of the hole 112 of the disk 20, and in fact the flat edge portions 112a and 112b constitute tangents to the points on the round hub portion 90 at which the edges 112a and 112b contact the hub portion 90.

Figure 21:
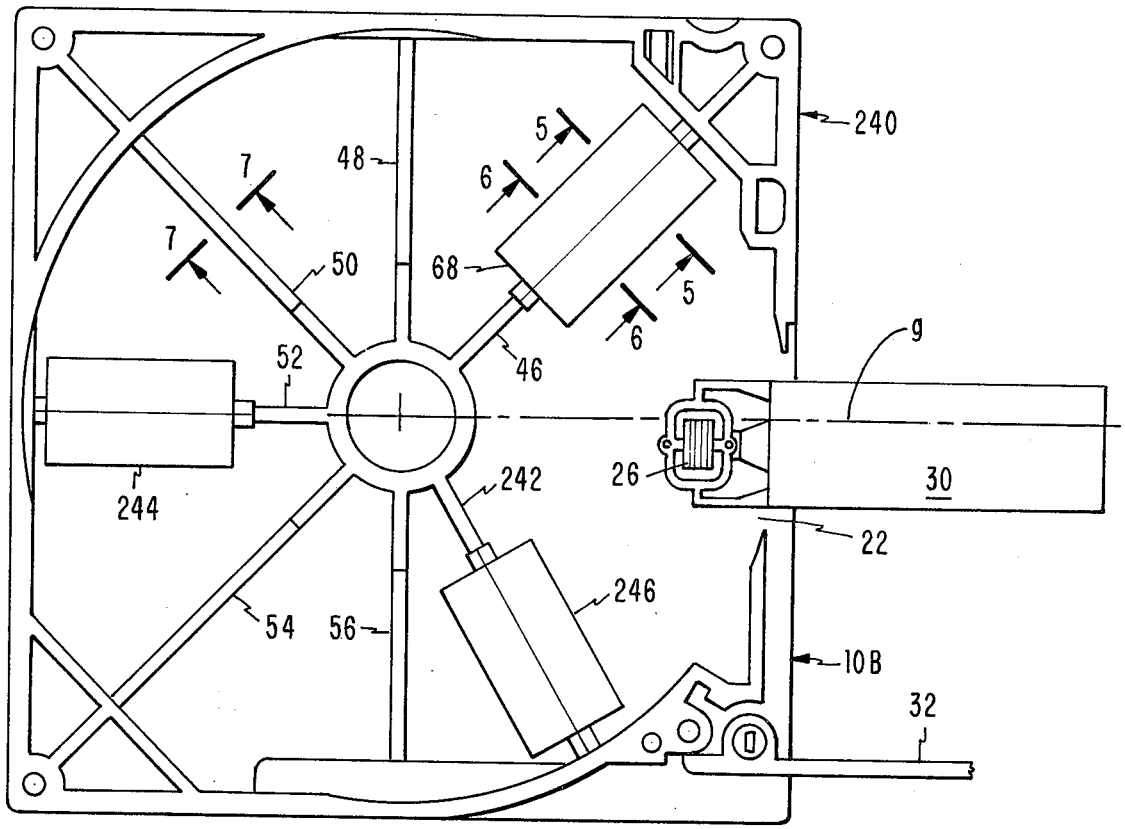
FIG. 21 is a view similar to FIG. 3 and showing a lower cover half of a modified form of the cartridge.

The modified cartridge 240 shown in FIG. 21 is the same as that shown in FIGS. 1 and 3 with the following exceptions:

(1) The ribs 58, 60 and 62 and the corresponding ribs on the top half of the cartridge have been deleted;

(2) A rib 242 on the lower half of the cartridge 240 and corresponding rib in the upper half of the cartridge 240 have been added;

(3) Wipe 69 on rib 54 and the corresponding wipe in the top cartridge half have been omitted; and (4) Wipes 224 and 246 on ribs 52 and 242 and corresponding wipes carried by the top half of the cartridge 240 in register with wipes 244 and 246 have been added.

The rib 242 extends radially nearly at the same angle to center line g of cartridge 240 parallel with support spring arms 28 and 30. The wipes 244 and 246 and the corresponding wipes carried by the top half of the cartridge 240 are substantially the same as the wipes 68 and 74 shown in FIG. 6 and may be correspondingly supported by Mylar film strips. The wipes 244 and 246 and the corresponding wipes carried by the top half of the cartridge 240 have the same functions as the wipes 68, 69, 74, etc. previously described in connection with the first embodiment of the invention. The wipes 68 and 246, being positioned on opposite sides of the heads 24 and 26, tend to hold the disk 20 in a median position within the access opening 22 of the cartridge 240 so that the heads 24 and 26 may freely enter opening 22 on opposite faces of disk 20 without interference with the peripheral edge of disk 20.

Figure 22:
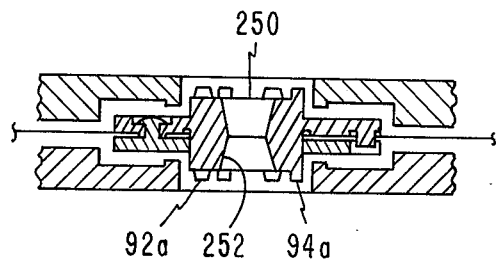
FIG. 22 is a fragmentary view similar to FIG. 4 and showing a modified hub assembly for the disk.
Figure 23:
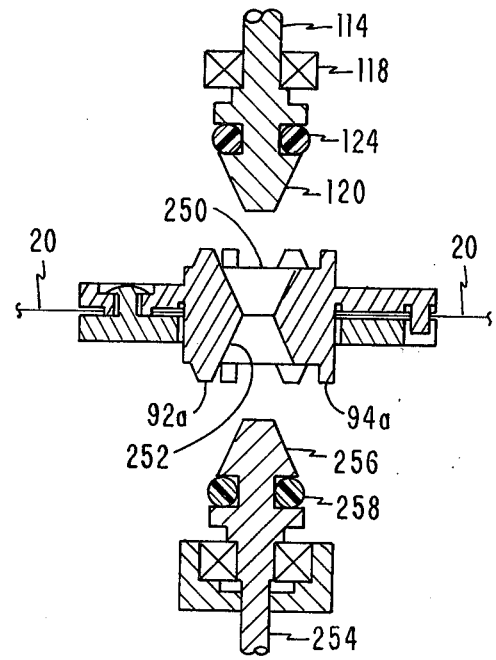
FIG. 23 is a view similar to FIG. 10 and showing the modified hub assembly of FIG. 22 together with a modified backing member and a drive member for engaging the modified hub assembly of FIG. 22.

The modified hub 250 shown in FIGS. 22 and 23 is substantially the same as the hub 80 and holds the disk 20 in substantially the same manner as the hub 80 except that a conical opening 252 is provided in the bottom side of the hub 250 in lieu of the cylindrical opening 88. FIG. 23 shows the mechanism for engaging the hub 250, and this mechanism is substantially the same as shown in FIG. 10 except that a backing member 254 is used instead of the backing member 116. The backing member 254 has a conical forepart 256 which substantially matches the conical opening 252, and a rubber O-ring 258 is provided in a peripheral groove of the backing member 254. The construction of backing member 254 is substantially the same as that previously described in connection with the drive member 114. The hub 250 is also provided with bosses 92a and 94a on its undersurface which are substantially identical with the bosses 92 and 94 previously described.

The drive member 114 drivingly engages the hub 250 in substantially the same manner as the drive member 114 engages the hub 80 of the first embodiment. The backing member 254 engages the hub 250 in substantially the same manner as the drive member 114 engages the hub 250, and the O-ring 258 is indented by the bosses 92a. The hub 250 and therefore the disk 20 carried by the hub 250 may thus be driven from either the top or bottom as the assembly is illustrated in FIG. 23 using either the member 114 or the member 254 to drive.

We claim:

1. A magnetic disk having a first, non-round central opening therethrough and being formed with an abutment for drivingly rotating the disk about said central opening and which is spaced from said central opening, said non-round central opening having a pair of camming edges extending toward each other at a first angle and toward an apex located on a first radial line of the disk, said abutment being located on a second radial line of the disk extending at a second angle with respect to said first radial line.

2. A disk as set forth in claim 1, said abutment being provided by an edge of a second opening through the disk spaced from said first opening.

3. A disk as set forth in claim 2, said camming edges being straight.

4. A disk as set forth in claim 3, said first angle being between 30 degrees and 120 degrees.

5. A disk as set forth in claim 3, said first angle being substantially 60 degrees.

6. A disk as set forth in claim 3, said second angle being substantially 90 degrees.

7. A disk as set forth in claim 1, said abutment being formed by a pin extending through the disk and spaced from said non-round central opening.

8. A magnetic disk assembly comprising:

a magnetic disk member having a first, central opening therethrough and being formed with an abutment for drivingly rotating the disk about said central opening and which is spaced from said central opening, a hub assembly having a hub member extending loosely through said central opening of said disk member for loosely mounting said disk member on the hub assembly and having a driving portion engaging with said abutment for thereby driving said disk member along with the hub assembly, said hub member having exterior camming surfaces and said disk member having interior camming surfaces constituting portions of the edges of said central opening of said disk member which cooperate with the exterior camming surfaces of said hub member, the tangents passing through said camming surfaces of one of said members when said interior and exterior camming surfaces are in engagement extending toward each other at a first angle and toward an apex which is located on a first radial line of said disk member and said abutment being located on a second radial line of said disk member which is disposed at a second angle with respect to said first radial line whereby the hub assembly in driving said abutment causes said exterior and interior camming surfaces to move into and remain in contact so as to thereby locate said disk member at a certain fixed position on said hub member.

9. A disk assembly as set forth in claim 8, said hub member being round and said exterior camming surfaces being provided by the rounded periphery of said hub member, said central opening in said disk member being non-round and having straight edges which constitute said interior camming surfaces that cooperate with the rounded periphery of said hub member.

10. A disk assembly as set forth in claim 8, said central opening of said disk member being round so that said interior camming surfaces are provided by the round edge of said central opening, said hub member being non-round and being provided with a pair of rounded edge surfaces which are spaced apart less than the diameter of said central opening of said disk so that they constitute said exterior camming surfaces which cooperate with edges of said central round opening of said disk member for locating said disk member in its said certain fixed position on said hub member.

11. A disk assembly as set forth in claim 8, said abutment being formed by a second opening through said disk member which is spaced from said central opening of the disk member and said driving portion of said hub assembly constituting a driving pin extending loosely through said second opening for thereby drivingly rotating said disk member.

12. A disk assembly as set forth in claim 8 and including means for providing a restraint against rotation of said disk member and effective at a place on said disk member located a greater radius from the center of said central opening than that at which said abutment is located.

13. A disk assembly as set forth in claim 8 and including a magnetic head which is effective on a face of said disk member at a place located radially farther outwardly from said central opening than the place at which said abutment is located on said disk member for transferring data with respect to the magnetic disk member and for restraining its rotation for causing said camming surfaces to thereby locate said disk member at said certain fixed position on said hub member.

14. A disk assembly as set forth in claim 13 and including a second magnetic head located on the face of said disk member opposite that at which said first named head is located and acting also to restrain the rotation of said disk member to cause said camming surfaces to locate the disk member on the hub member.

15. A disk assembly as set forth in claim 8 and including a wipe effective on a face of said disk member at a place on the disk member spaced radially farther outwardly from said central opening than said abutment for restraining the rotation of said disk member thereby causing said camming surfaces to locate said disk member at said certain fixed position on said hub member.

16. A disk assembly as set forth in claim 15 and including a second wipe located to be effective on the face of said disk member opposite that on which said first named wipe is effective and similarly operative to restrain the rotation of said disk member for causing said camming surfaces to locate the disk member on the hub member.

17. A disk assembly as set forth in claim 15, said central opening through said disk member being non-round and having a pair of straight edges which constitute said interior camming surfaces and said hub member being round so that its rounded periphery provides said exterior camming surfaces, said straight edges of said disk member extending toward each other at an angle between 30 degrees and 120 degrees and toward an apex located on a first radial line on said disk member.

18. A disk assembly as set forth in claim 17, said abutment being provided by the edge of a second opening through said disk member which is located on a second radial line of the disk member, said first and second radial lines being spaced apart about 90 degrees.

19. A disk assembly as set forth in claim 15 and including a cartridge in which said disk member is rotatably disposed and having an opening in the cartridge in alignment with said hub member whereby the hub member may be rotatably driven, said wipe being carried by an inside surface of said cartridge.

20. A disk assembly as set forth in claim 16 and including a cartridge in which said disk member is rotatably disposed and having an opening in the cartridge in alignment with said hub member whereby the hub member may be rotatably driven, said wipes being carried by inside surfaces of said cartridge.

* * * * *